Jan. 26, 1926. 1,570,880
L. DUNKELSBERG
OPHTHALMIC MOUNTING
Filed Feb. 20, 1925
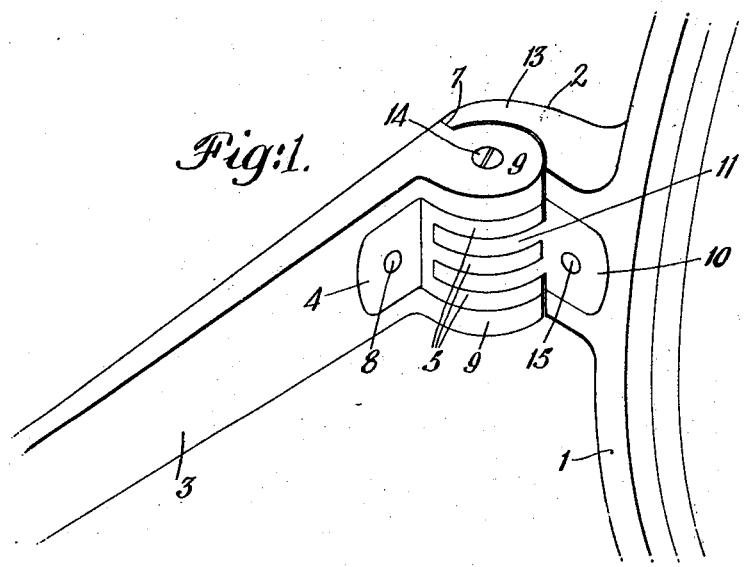
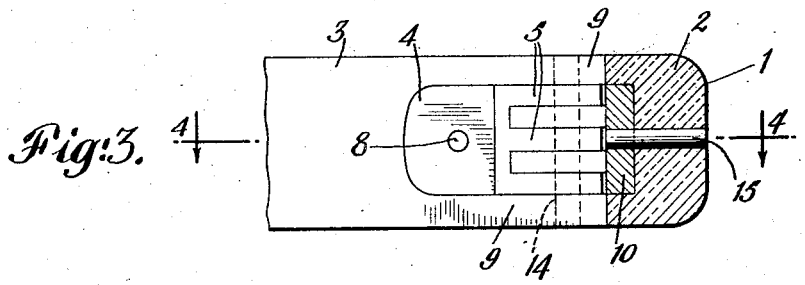
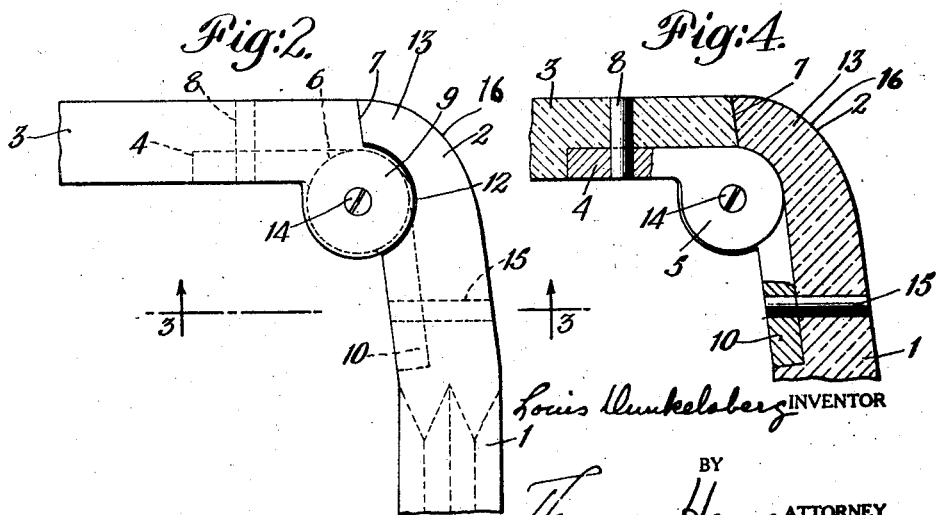
Louis Dunkelsberg INVENTOR
BY Thomas Howe ATTORNEY Patented Jan. 26, 1926.

1,570,880

UNITED STATES PATENT OFFICE.

LOUIS DUNKELSBERG, OF NEW YORK, N. Y.

OPHTHALMIC MOUNTING.

Application filed February 20, 1925. Serial No. 10,457.

*To all whom it may concern:*

Be it known that I, LOUIS DUNKELSBERG, a citizen of the United States of America, residing at city of New York, county of Kings, and State of New York, have invented new and useful Improvements in Ophthalmic Mountings, of which the following is a specification.

This invention relates to improvements in ophthalmic mountings and especially to the manner of securing temples to the fronts of spectacle frames.

The principal object of the present invention is the provision of an improved type of composition or nonmetallic frame, such as zylonite (celluloid), shell or the like, which shall present a neat, novel and ornamental appearance forming an improvement over anything previously known in this respect.

A further object of the present invention is the provision of an improved construction in which the temples and fronts shall be so united as to accomplish the results as above indicated with a reduced pupillary width of frames of the character referred to, rendering the mounting more satisfactory both from considerations of appearance and the avoidance of undesirable lateral projections, and furthermore in which the front adjacent the temple shall be of smooth and unbroken form, and in which the hinges for the frame shall be disposed in inconspicuous position concealed when the mounting is viewed from the front and unsightly lateral projections, affording hinged connections or attachments, shall be eliminated.

It has been proposed to accomplish the above objects by having rearwardly curved endpiece portions to which the temples are hinged, the temples abutting against the ends of the projections which, by reason of the curvature of the projections, face rearwardly. This, however, involves the labor and trouble incident to produce the curved projections as distinguished from straight projections and metallic reinforcement of these curved projecting end piece portions is required to prevent the accidental straightening thereof.

According to the present invention it is proposed to accomplish all of the results as indicated by the use of straight rather than rearwardly curved end-piece projections, the temple abutting against the side of the projection rather than the end thereof.

A further object of the invention is to provide a mounting of the desirable appearance as indicated but in which the parts are readily repaired or replaced upon injury or breakage of them.

Other and ancillary objects of the invention will appear hereinafter.

In the accompanying drawings which illustrate the invention—

Fig. 1 is a perspective view of one side of a spectacle frame showing the manner of attachment of a temple to the front, sufficient of the frame being shown to illustrate the application of the invention thereto but the greater portion of the frame being broken away, it being understood that the front consists of the usual lens frames or rims connected by the nose piece or bridge and that the other temple is secured to the other side of the frame in the same manner as is illustrated in this figure;

Fig. 2 is a top plan view of the temple and front connection as shown in Fig. 1, the greater part of the front and the one temple shown being broken away;

Fig. 3 is a section on the line 3—3 of Fig. 2; and

Fig. 4 is a section on the line 4—4 of Fig. 3.

Referring to the drawings, the front 1 of composition as above referred to has integrally formed with it the temple securing projecting end-piece 2. The temple 3 of similar material is secured to the frame by means of a metal hinge, the two members of which are respectively secured to the temple 3 and the projection 2. The hinge member secured to the temple comprises a flat plate 4 integrally connected with the barrels 5. The plate 4 is inlaid upon the inside of the temple 3 so that their surfaces are substantially flush and a recess 6 is formed in the temple to accommodate a part of the hinged barrel, the hinged barrels also projecting beyond the end 7 of the temple. This hinged member is secured to the temple by means of a single circular rivet 8 which, because of the inlaying of the hinge firmly holds the hinge member in proper relation to the temple. A shell-like plate 9 of material the same as the temple and integral therewith extends over the ends of the hinge barrels both above and below so as to substantially remove the metallic portions from view.

The hinge member secured to the front comprises a flat metal plate 10, inlaid into the projection 2 so that its surface is substantially flush with that of the inside surface of the projection, and also the barrels 11 integral with the plate 10. There is formed in the projection 2 a recess 12 at the rear side of the projection receiving part of the hinged barrels, these barrels projecting somewhat to the rear of the projection as shown most clearly in Figs. 2 and 4, the material 13 of the projection being outside the barrel of the hinge and adapted to abut against the end 7 of the temple so that the exterior of the hinge is covered by the end of the temple and the projection 13 when the temple is in position on the wearer. The outer corner of the projection may be rounded as shown at 16 to improve the appearance. When not in use the temples can be folded inwardly in the usual manner to lie compactly against the spectacle front. The hinge members are secured together by the usual pivot pin 14. In the case of the hinge member secured to the projection 2, this is also secured by a single rivet 15 and for reasons as stated this is sufficient to firmly secure the hinge to the frame front. The inlaid construction of the hinge, therefore, as shown with the single rivet for each hinge member enables the hinge plates to be shortened which is of particular importance in that it permits the projection 2 to be shortened whereby the compactness of the structure is enhanced.

In previous structures designed to attain the objects of the present invention it has been proposed to insert a tang forming a part of the hinge member endwise into the composition of the frame. In such cases damage or breakage of the hinge requires the whole frame to be thrown away because the hinge members cannot be substituted without a great deal of labor and probable destruction of the frame. With the present construction, however, a damaged hinge member can be removed by simply driving out a rivet and a new member put in place by inserting and securing the rivet in the usual manner.

Altogether a spectacle frame having the desired characteristics as above outlined is, by the present invention, attained in a peculiarly efficient, inexpensive and desirable manner.

While the invention has been illustrated in what is considered its best application it may have other embodiments without departing from its spirit and is not, therefore, limited to the structure shown in the drawing.

What I claim is:

1. An ophthalmic mounting including a non-metallic front for the mounting having an integral end-piece portion and a hinge member comprising a flat plate and barrel, said end-piece portion having said plate inlaid therein and a recess receiving at least a part of said barrel whereby the end of said portion extends circumferentially about said barrel to conceal at least a part of the barrel from view laterally and exteriorly of the mounting and a single rivet securing said member to said portion.

2. An ophthalmic mounting including a non-metallic front for the mounting having an integral end-piece portion and a hinge member comprising a flat plate and barrel, said end-piece portion having a recess receiving said plate and at least a portion of said barrel, means for securing said member to said projection, a temple of non-metallic material, a hinge member secured to said temple and comprising a flat plate and barrel, said temple having a recess adapted to receive the last mentioned plate and at least a portion of the last mentioned barrel, means for securing the last mentioned hinge member to said temple, the said barrels of the hinge members engaging to form a hinge connection between said temple and front and a hinge pin.

3. An ophthalmic mounting including a non-metallic front for the mounting having an integral end-piece portion and a hinge member comprising a flat plate and barrel, said end-piece portion having a recess receiving said plate and at least a portion of said barrel, a single rivet for securing said member to said portion, a temple of non-metallic material, a hinge member secured to said temple and comprising a flat plate and barrel, said temple having a recess adapted to receive the last mentioned plate and at least a portion of the last mentioned barrel, a single rivet for securing the last mentioned hinge member to said temple, the said barrels of the hinge members engaging to form a hinge connection between said temple and front and a hinge pin.

4. An ophthalmic mounting comprising in combination a non-metallic front for the mounting having an integral, laterally extending, straight end-piece portion, a hinge member comprising a flat plate and barrel, said end-piece portion having a recess in its rear face adapted to receive said plate and at least a part of said barrel, means for securing said hinge member to said portion, a temple, a hinge member having a flat plate and barrel, said temple having upon its interior face a recess adapted to receive the last mentioned plate and at least a portion of the last mentioned barrel, means for securing the last mentioned member to said temple, said barrels cooperating to form a hinge between said front and temple and a hinge pin for securing said barrels together.

5. An opthalmic mounting comprising in combination, a non-metallic front for the mounting having an integral, laterally extending, straight end-piece portion, a hinge member comprising a flat plate and barrel, said end-piece portion having a recess in the rear face adapted to receive said plate and at least a part of said barrel, a single rivet for securing said hinge member to said portion, a temple, a hinge member having a flat plate and barrel, said temple having upon its interior face a recess adapted to receive the last mentioned plate and at least a portion of the last mentioned barrel, a single rivet for securing the last mentioned member to said temple, said barrels cooperating to form a hinge between said front and temple and a hinge pin for securing said barrels together.

6. An ophthalmic mounting comprising in combination, a non-metallic front for the mounting having an integral, laterally extending, straight end-piece portion, a hinge member comprising a flat plate and barrel, said end-piece portion having a recess in its rear face adapted to receive said plate and at least a part of said barrel, a single rivet for securing said hinge member to said portion, a temple, a hinge member having a flat plate and barrel, said temple having upon its interior face a recess adapted to receive the last mentioned plate and at least a portion of the last mentioned barrel, a single rivet for securing the last mentioned member to said temple, said barrels cooperating to form a hinge between said front and temple and a hinge pin for securing said barrels together, the material of said temple extending over and being co-extensive with the ends of the hinge barrel.

In testimony whereof I have signed this specification this 7th day of February 1925.

LOUIS DUNKELSBERG.